United States Patent
Christensen et al.

(10) Patent No.: US 8,255,380 B2
(45) Date of Patent: Aug. 28, 2012

(54) SYSTEM AND METHOD FOR ONTOLOGY-BASED LOCATION OF EXPERTISE

(75) Inventors: James E. Christensen, Cortlandt Manor, NY (US); Daniel M. Gruen, Newton, MA (US); Susanne Hupfer, Lexington, MA (US); Stephen E. Levy, Honolulu, HI (US); John F. Patterson, Carlisle, MA (US); Jamie C. Rasmussen, Somerville, MA (US); Steven I. Ross, South Hamilton, MA (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 12/642,430

(22) Filed: Dec. 18, 2009

(65) Prior Publication Data

US 2011/0153597 A1 Jun. 23, 2011

(51) Int. Cl.
*G06F 17/30* (2006.01)
(52) U.S. Cl. .................................. 707/706; 707/778
(58) Field of Classification Search .................. 707/706, 707/778
See application file for complete search history.

(56) References Cited

U.S. PATENT DOCUMENTS

| | | | | |
|---|---|---|---|---|
| 6,385,611 B1 * | 5/2002 | Cardona | ............................... | 1/1 |
| 6,944,612 B2 * | 9/2005 | Roustant et al. | .............. | 707/706 |
| 7,320,031 B2 * | 1/2008 | Konig et al. | .................. | 709/224 |
| 7,685,276 B2 * | 3/2010 | Konig et al. | .................. | 709/224 |
| 7,730,010 B2 * | 6/2010 | Kishore et al. | ................ | 707/783 |
| 8,024,662 B2 * | 9/2011 | Jerrard-Dunne et al. | ..... | 715/751 |
| 8,042,051 B2 * | 10/2011 | Jerrard-Dunne et al. | ..... | 715/757 |
| 2010/0070554 A1 * | 3/2010 | Richardson et al. | .......... | 709/202 |
| 2010/0205541 A1 * | 8/2010 | Rapaport et al. | .............. | 715/753 |

OTHER PUBLICATIONS

Liu, Z., et al., "Use of Owl for describing Stream Processing Components to enable Automatic Composition," IBM T.J. Watson Research Center, http://choices.cs.uiuc.edu, 10 pages, retrieved from Internet, Nov. 9, 2009.

Gruen, D., et al. "Collaborative Reasoning and Collaborative Ontology Development in CRAFT," AAAI Spring Symposium on Semantic Web Knowledge Engineering (SWKE), Standford, CA, Mar. 2008.

Singley, K., et al. "Bluereach: harnessing synchronous chat to support expertise sharing in a large organization," Conference on Human Factors in Computing Systems, www.aaai.org, 3 pages, retrieved from Internet, Dec. 3, 2009.

IBM Research, "Small Blue," 5 pages, http://domino research.ibm. com, retrieved from Internet, Dec. 3, 2009.

(Continued)

*Primary Examiner* — Kim Nguyen
(74) *Attorney, Agent, or Firm* — Hamilton, Brook, Smith & Reynolds, P.C.

(57) ABSTRACT

An expertise locator enables user defined correspondences between experts and respective certain objects. Each object inherits from classes in a hierarchy. Using the correspondences, a locator processor routine finds a candidate expert about a particular subject area. The candidate expert may be in a correspondence with a certain object whose class is a subclass of the particular subject area. Output may display an indication of the candidate expert, relevant expertise per candidate and/or a list of experts per certain object. In the case of the certain objects being topics, the hierarchy is an ontology of the topics.

20 Claims, 10 Drawing Sheets

OTHER PUBLICATIONS

IBM Press Room, "IBM's Intranet One of the World's Top Ten" Nielsen Norman Group Recognizes IBM Employee Portal in 2005 Report on Best Intranets, www.-03.ibm.com, 2 pages, retrieved from Internet, Dec. 3, 2009.

Sleeman, D. and Musen, M., "Symbiotic Relationships between Semantic Knowledge Engineering," papers from the 2008 AAAI Spring Symposium, www.aaai.org, 2 pages, retrieved from Internet, Nov. 9, 2009.

* cited by examiner

SYSTEM AND METHOD FOR ONTOLOGY-BASED LOCATION OF EXPERTISE

GOVERNMENT SUPPORT

This invention was made with Government support under Distillery Phase IV-H98230-07-C-0383 awarded by a United States Intelligence Agency. The Government has certain rights to this invention.

BACKGROUND

The present invention relates to automating location of expertise, and more specifically, to using associations between individuals and specific objects (which inherit from classes in a hierarchy) to find experts about a particular subject area, and in response to a search of a more general superclass, finding experts associated with particular objects inheriting from that superclass.

Expertise location is the process of identifying individuals with the relevant knowledge or skills to solve a problem. Some existing expertise location systems merely provide a directory of people and their topics of expertise. These systems can be queried to find people asserted to be experts on a topic, or the list of topics that a person is considered an expert on. Such systems have a variety of drawbacks:

1. The possible expertise topics may be fixed. This prevents an expert from asserting their expertise in an area not thought of by the designers of the expertise location system.

2. The possible expertise topics may be open-ended, such as keywords or search terms. It is time-consuming and very difficult for an expert to think of the keywords that an expertise seeker may try.

3. The possible expertise topics may be unstructured. The expert may have the burden of asserting topics at many levels of specificity for the same general area of expertise.

4. It may be labor-intensive for an expert to keep manually associated topics of expertise up-to-date as their skills or knowledge change.

Some expertise location systems analyze knowledge artifacts such as bookmarks or written documents to automatically determine relevant expertise, typically associating users with particular keywords. Although this removes the need for explicit expert/topic association, it can be difficult to correct mistaken associations or for a user to judge the amount or scope of another's expertise.

Some expertise location systems, such as IBM's BlueeReach, maintain a taxonomy of expertise topics. This avoids having to think of specific keywords to use as expertise topics, and may allow the expert to assert expertise on a family of related concepts, but such systems typically do not allow easy modification of the possible expertise topics by end users.

Some expertise location systems, such as IBM's SmallBlue, take advantage of contextual information such as the seeker's social network to improve the ranking of suggested experts, i.e. ranking more highly those experts that a seeker knows or can ask for an introduction to. Although this is useful information for the expertise seeker, it is primarily helpful when there is an abundance of experts, or where the seeker is comfortable asking for personal referrals.

Applicants have discovered that in order to solve these problems, an expertise location system must have the following properties:

1. The possible expertise topics must be extensible.
2. Experts should be guided towards reusing common terms, rather than an open-ended variety of terms that describe the same topic.
3. The topics should be arranged in a hierarchy that allows easy expert association with either a very specific topic or a more general area of expertise.
4. The expertise location should take implicit expertise as well as explicitly asserted expertise into account. Ideally, at least one expert should be locatable for every topic.
5. In addition to locating experts by topic, the architecture should support enumerating the topics that a particular individual is an expert on. The full set of expertise should be filterable to only the subset that is relevant to a given context.
6. The system must be able to provide the list of experts for a provided topic in a sorted order, beginning with the experts who have the most relevant expertise.
7. The system must be able to provide some explanation of why a particular person was recommended as an expert on a provided topic.
8. To make efficient use of computational resources, the expertise location algorithm should support a configurable target count of experts. In some cases, one may only need to know if a topic has any associated expert or not. In other cases, one may need an exhaustive list of associated experts.

BRIEF SUMMARY

In this disclosure, Applicants describe a system with the foregoing properties. Applicants have implemented this invention in the context of a. Collaborative Reasoning and Analysis Framework and Toolkit (referred to as CRAFT). CRAFT users are referred to as "analysts", as the application is primarily intended for use in domains like business intelligence, financial forecasting, etc. The goal of CRAFT is to provide a system that helps analysts, working together and separately, to gather information and make decisions, and allows them to benefit from the information gathering and decision-making activities of others in support of their own work. Analysts using CRAFT will model situations, activities, and individuals of interest, and in the course of doing so may extend a common ontology that provides a vocabulary of classes, properties, and entities that are shared across the organization.

One particular embodiment of the invention is described, in the context of locating individuals with the knowledge or skills to solve a conceptual modeling problem. In the case described, Applicants show how to locate those experts that can help a non-technical user submit a complicated semantic query to the System S stream computing platform. For additional information about CRAFT and System S inquiries see:

Gruen, D., Rasmussen, J. Liu, J., Hupfer, S., and Ross, S. "Collaborative Reasoning and Collaborative Ontology Development in CRAFT". AAAI Spring Symposium on. Semantic Web and Knowledge Engineering (SWKE), Stanford, Calif., March 2008

Liu, Z., Ranganathan, A., and Riabov, A. 2007. "Use of OWL for describing Stream Processing Components to enable Automatic Composition." Proceedings of the OWLED 2007 Workshop on OWL: Experiences and Directions. Innsbruck, Austria, Jun. 6-7, 2007

U.S. Publication No. 2009/0094184, publication date Apr. 9, 2009, entitled "A Method and Apparatus for Providing On-Demand Ontology Creation and Extension" (by assignee), and U.S. application Ser. No. 12/017,026 filed Jan. 19, 2008, entitled "A System and Method for Supporting Collaborative Reasoning" (by assignee); each herein incorporated by reference in their entirety.

Applicants describe a method for associating or otherwise corresponding experts with topics that are arranged in an extensible concept hierarchy, a mutable ontology. Unlike a keyword-based solution, an ontology allows matching seekers who specify a very specific topic with experts who have asserted knowledge on a more broad topic. Also unlike a keyword-based solution, the ontology provides a common language for experts to describe their expertise and seekers to describe their need, increasing the chances that an appropriate match can be found. Although some taxonomy or ontology-based systems do not allow modifying the topic hierarchy, Applicants' system can be extended on demand, so an expert who does not find an appropriate way of characterizing his expertise can add any necessary concepts or topics.

The present invention expertise location algorithm/tool starts with a given class or property, and proceeds in a recursive manner. The invention process starts with the experts who have the most relevant expertise, and continues searching to find experts with less relevant expertise. If a limit has been specified, the number of experts is checked after each addition, and the search is aborted once the requested number of experts has been reached. For each expert located, the process keeps a list of all the ontology resources that were encountered during the search that had that person associated as an expert. This list of relevant expertise is shown in the user interface in one embodiment, to help explain to the analyst why the expert is being recommended.

To alleviate the burden of manual association of experts with topics, the present invention allows both explicit and implicit associations to be added, and ensures that at least one expert is locatable for every topic. Embodiments of the present invention can also provide a list of topics that a given expert can provide assistance for.

In one embodiment, a computer method or apparatus locates expertise by:

associating experts with respective certain objects (such as via a user interface), each object inheriting from classes or properties in a hierarchy, said associating resulting in respective correspondences between experts and the certain objects;

using the correspondences in a computer processor routine or locator tool, finding a candidate expert about a particular subject area, the candidate expert being in one of the correspondences associating the candidate expert with one of the certain objects; and displaying as output an indication of the candidate expert.

In one embodiment, the particular subject area is a superclass of a class of the one certain object in the one correspondence of the candidate expert. The particular subject area may be a subclass of a class of the one certain object in the one correspondence of the candidate expert.

In accordance with one aspect of the present invention, the certain objects are topics, and the hierarchy is an ontology of the topics.

The output further indicates relevancy of the candidate expert in some embodiments.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
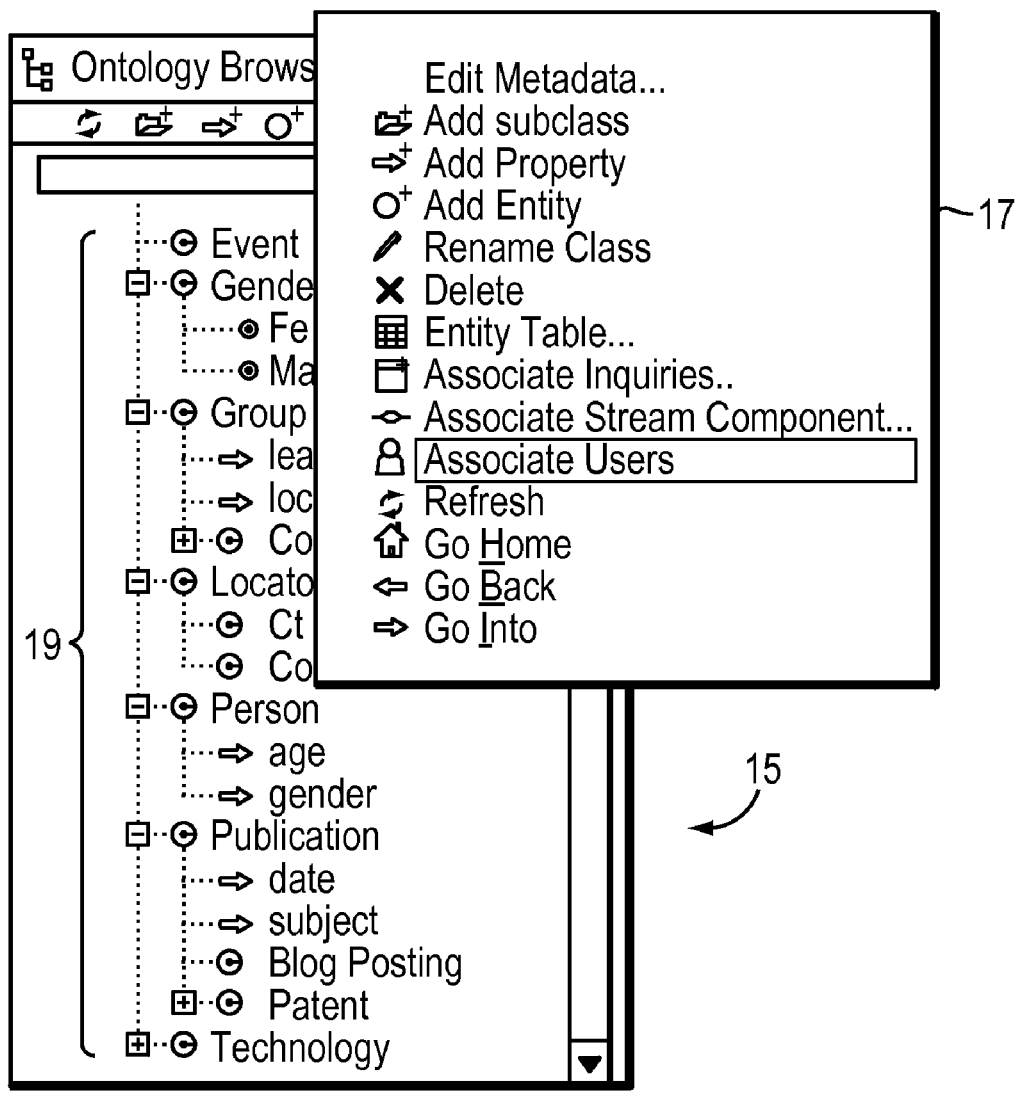
FIGS. 1 and 2 are schematic views of an Ontology Browser in embodiments of the present invention allowing association of experts/users with resources or objects.

With reference now to FIGS. 1-8 an example, non-limiting embodiment of the invention is shown and described.

User Experience in One Embodiment

In any complex system, particularly a collaborative one that manages user-defined content for a large number of people, users will encounter situations in which they feel the need to ask questions of, or ask for help from other users who have expertise in a particular aspect of the system or its content. Collaborative knowledge management systems are a good example of a complex system where novice users may have frequent questions for more experienced users, where representing knowledge using formal semantics can be very challenging. Questions will arise as to the right way to represent a particular situation, activity, or individual, or how to capture certain relationships. The intended meaning of some of the classes and properties in the ontology may not always be clear. In such cases, a user will want to locate more experienced users who have dealt with such problems in the past for advice, or to find the individuals who defined these classes or properties to ask for clarification.

CRAFT (by assignee) allows analysts to specify an inquiry they would like executed on the System S core. The analyst uses a graphical editing tool to create a semantic model that represents the desired output of the inquiry. This model is converted into a textual representation to be passed to a planner along with the ontology used and a set of System S Data Sources (DS) and Processing Elements (PE) that have been semantically annotated using the same ontology. See Liu, Ranganathan, Riabov 2007 cited above and herein incorporated by references in its entirety. The planner creates a processing graph from the available DSs and PEs that can provide the requested output.

Not all inquiries are plannable, and in fact, some are trivially unplannable. For example, an inquiry that requests blog entries will fail if there is no DS or PE that can output blog entries. In this case, Applicants say the inquiry contains "unsupported terms". Unsupported terms may be particularly common in systems like CRAFT, where a common ontology is used for several different purposes and may be easily extended by its users.

It is possible to determine if an inquiry contains unsupported terms without invoking the planner. Unfortunately, though the CRAFT system can immediately inform the analyst that an inquiry is trivially unplannable, resolving the problem may require the creation of one or more semantically annotated data sources or processing elements. The analyst may not have the knowledge or access to do this, in which case the problem becomes one of locating an "expert" such as a software engineer or knowledge engineer who can help the analyst by providing the changes needed to make the specified inquiry plannable.

In a CRAFT system 12 embodying the present invention, a "resource" 19 is a generic term for any semantic item. Examples of resources 19 include ontology classes and properties, entities, inquiries, users, and semantic descriptions of stream data sources or processing elements ("stream components"). Any resource 19 in the CRAFT system 12 may optionally have associated experts. The list of experts is stored as metadata about that resource 19. This creates a searchable respective correspondence between an expert/user and a resource 19 as will be made clear later.

Figure 2:
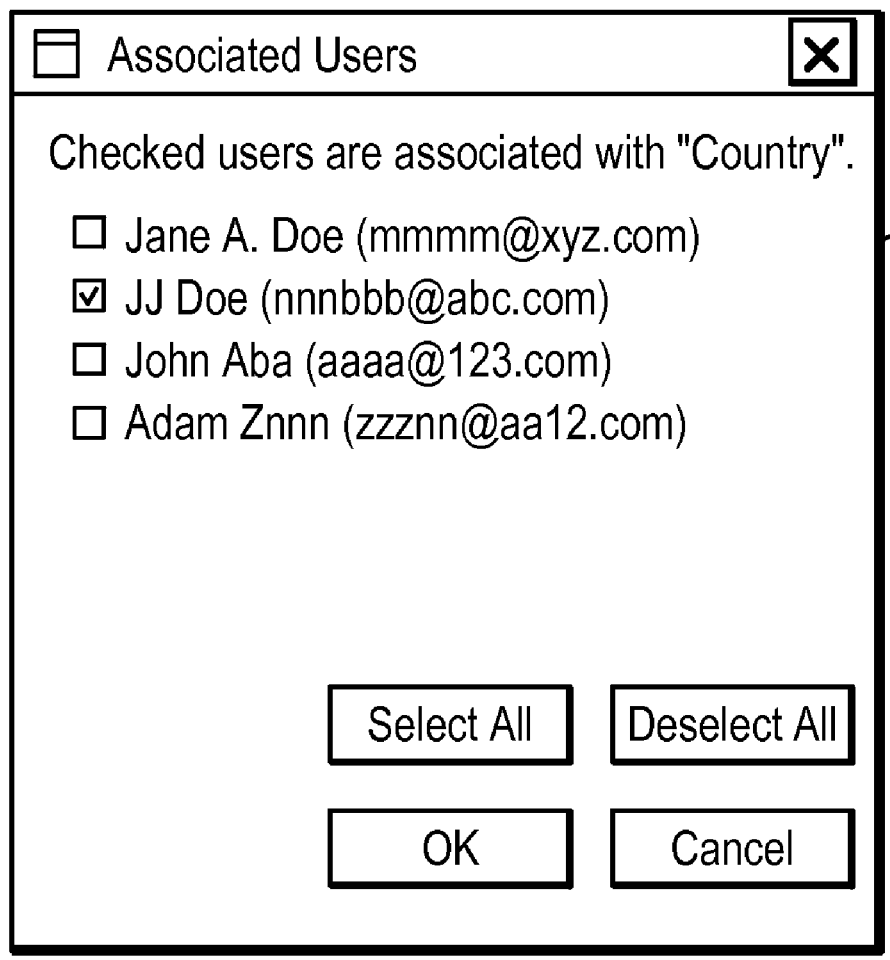

The CRAFT system 12 allows resources 19 to be manually associated with experts. That is, the system 12 provides a user interface that enables a user to associate (correspond) experts and resources 19 as illustrated in FIGS. 1 and 2. A context menu 17 action in the system Ontology Browser 15 (FIG. 1) opens a dialog 21 to configure such association/correspondence (FIG. 2).

In one embodiment, the dialog 21 provides buttons for quickly selecting all or none of the users in the system 12. Note that this dialog 21 only allows configuring the experts to be directly associated with a resource 19. It does not display users who can be inferred to be experts on the resource 19.

Figure 3:
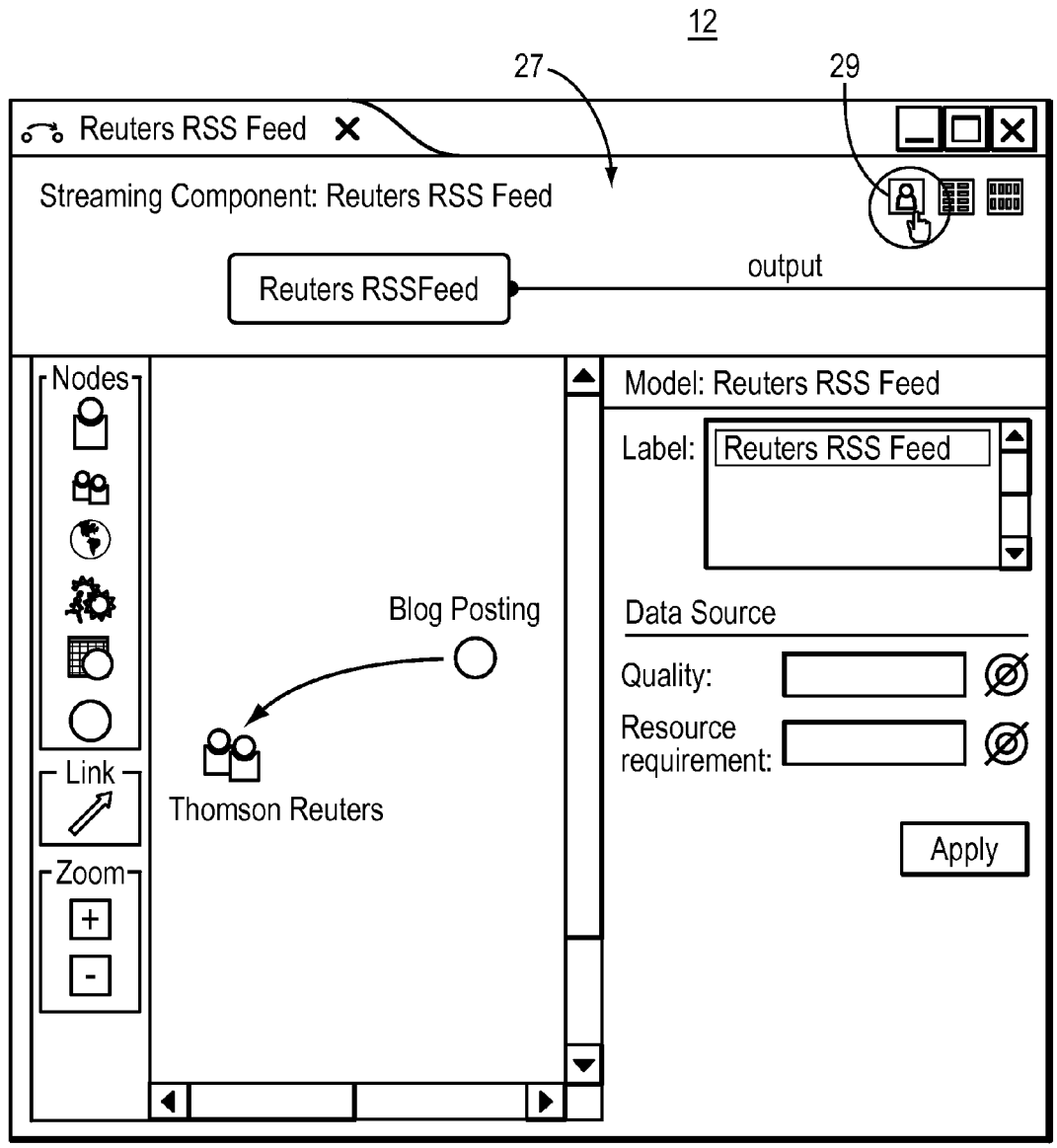
FIG. 3 is a schematic view of a user interface in the embodiment of the present invention illustrating a toolbar button that allows user association of experts with a displayed resource (i.e., a stream component or processing element).

Turning to FIG. 3, CRAFT system 12 has an interface 27 for semantically annotating a processing element. As part of semantically annotating the inputs, parameters, and outputs of a stream component, such as a System S PE (processing element) illustrated in FIG. 3, the developer may optionally associate (correspond) the component as a resource 19 with experts. This is done by clicking a toolbar button 29 (or otherwise operating the corresponding function) that opens a dialog 21 similar to the one shown in FIG. 2.

Figure 4:
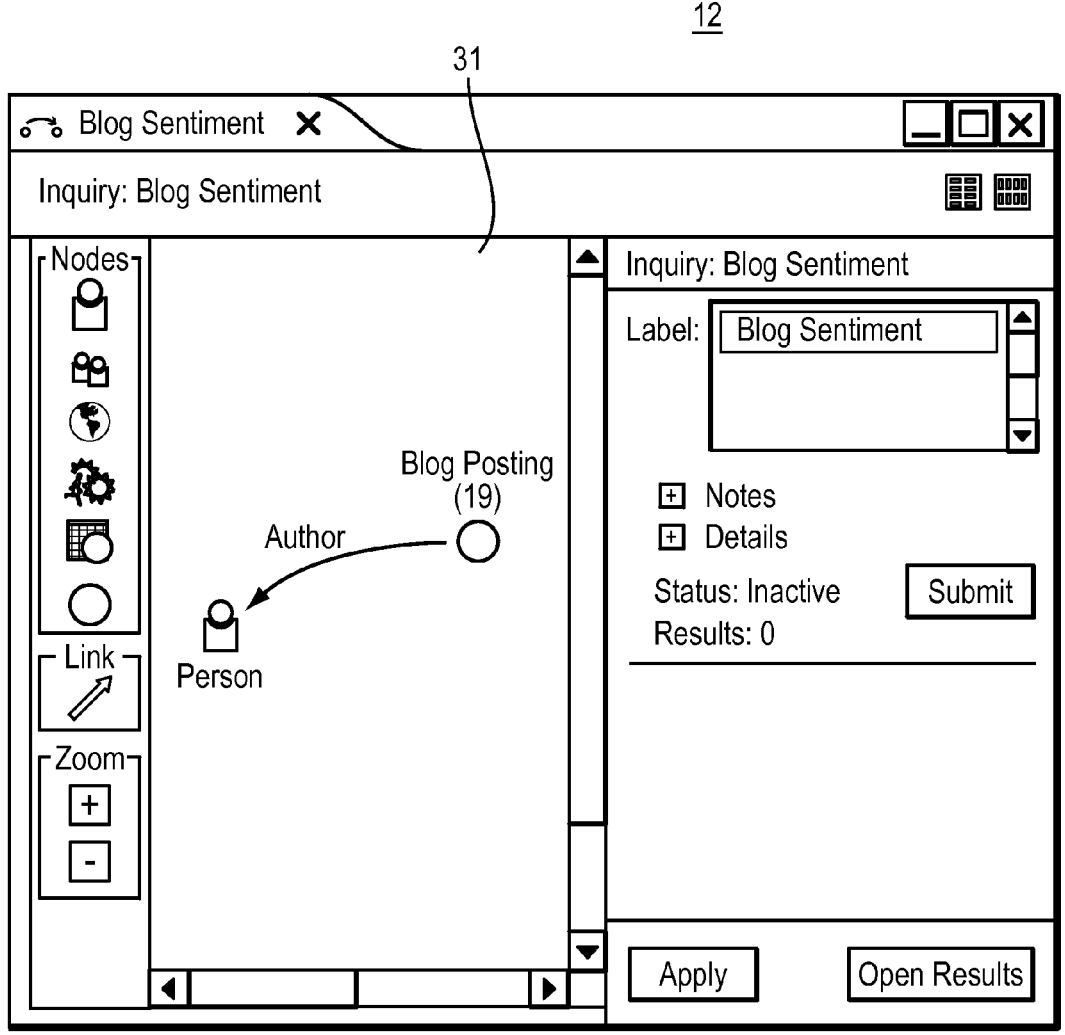
FIG. 4 is a schematic view of an example semantically expressed inquiry in one embodiment.
Figure 5:
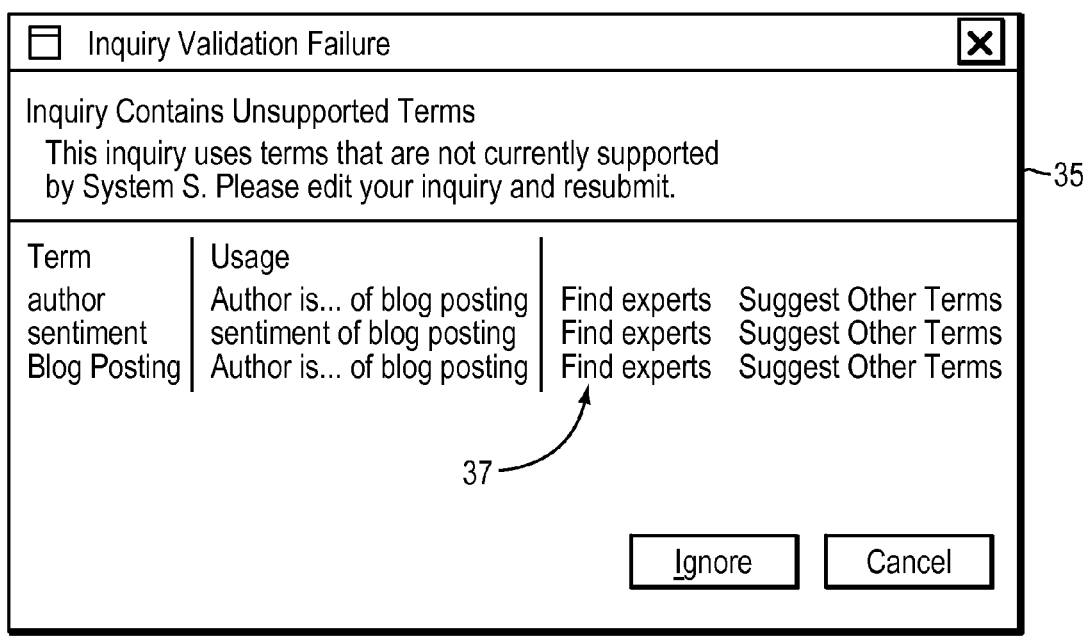
FIG. 5 is a schematic view of an example dialog box shown in one embodiment when an inquiry contains unsupported terms.

An example of a semantically expressed inquiry 31 in system 12 is illustrated in FIG. 4. When the analyst submits this inquiry 31, system 12 checks to see if any of the terms (classes or properties) that it uses are unsupported. To accomplish this, system 12 looks at all semantic models for all output streams of all stream components in the system. A term must be used in at least one semantic model in order to be supported. Inquiries with any unsupported terms are trivially unplannable. If the inquiry 31 contains one or more unsupported terms, system 12 generates and displays the dialog 35 shown in FIG. 5.

Figure 6:
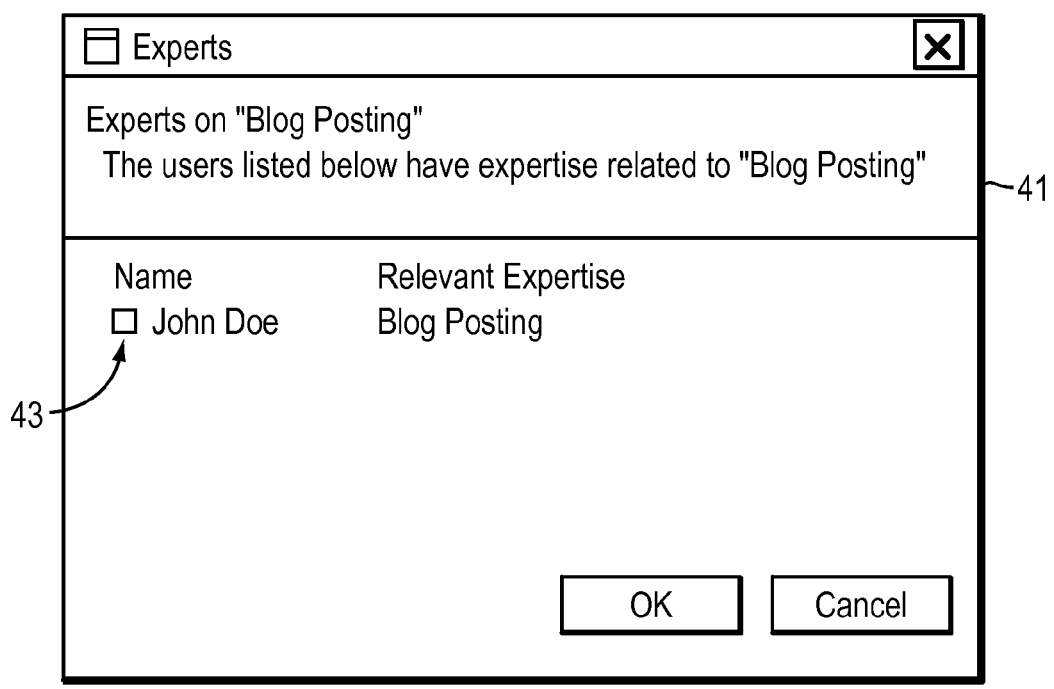
FIG. 6 is a schematic view of an example dialog box, in one embodiment indicating experts found in response to the inquiry of FIG. 4.

Next to each displayed unsupported term is a link 37 to launch the expert location tool 100 (FIG. 8) of the present invention. Expert location tool 100 reads the list of experts stored as metadata of the resource 19 corresponding to the subject term of dialog box 35. The experts associated with that term (corresponding resource) 19 are shown in a next dialog 41 (FIG. 6). In the example dialog 41 shown in FIG. 6, one expert has been found for the term "Blog Posting", the last entry displayed in dialog 35 of FIG. 5.

For each expert in dialog 41, one embodiment of system 12 displays a list of relevant expertise. Each expert's name is a link providing access to additional actions for that user. For example, an expert may be looked up in a directory service (system 12 supported, internet-mediated or other). The icon 43 next to the expert's name displays the expert's availability status in CRAFT system 12, and optionally in an associated chat service, such as IBM Lotus Sametime. This dialog 41 includes experts who are implicitly associated with the term's corresponding resource 19 or who have been inferred to be experts on the resource based on resource hierarchy or class relationships. It does not include the requesting user. Experts are listed in order from most relevant to least, according to a metric or heuristic.

Figure 7:
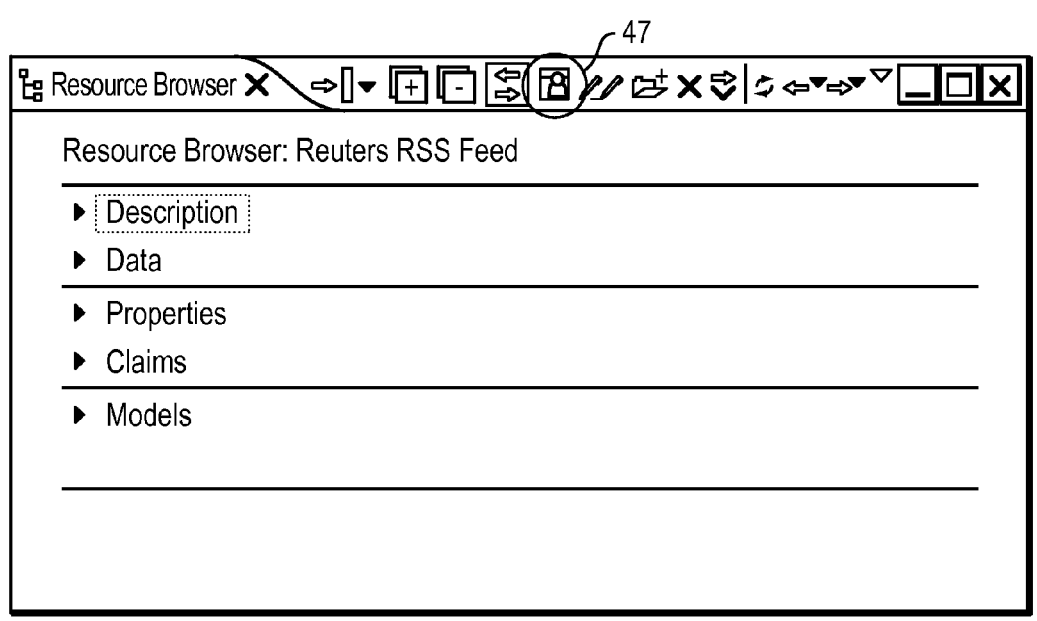
FIG. 7 is a schematic illustration of a Resource Browser in an embodiment enumerating experts associated with a resource and having a corresponding toolbar button to generate same.

At other times in the use and operation of CRAFT system 12, it is likewise possible to enumerate all of the experts associated with a resource 19, which shows a dialog 41 like the one in FIG. 6. In those instances, the requesting user is not blocked from appearing in the results. This action is invoked from within the toolbar (e.g., button 47) of CRAFT's Resource Browser component, as shown in FIG. 7. Operation of button 47 launches expert location tool 100 of the present invention as described above.

Expertise Location Algorithm (Locator Tool 100)

Figure 8:
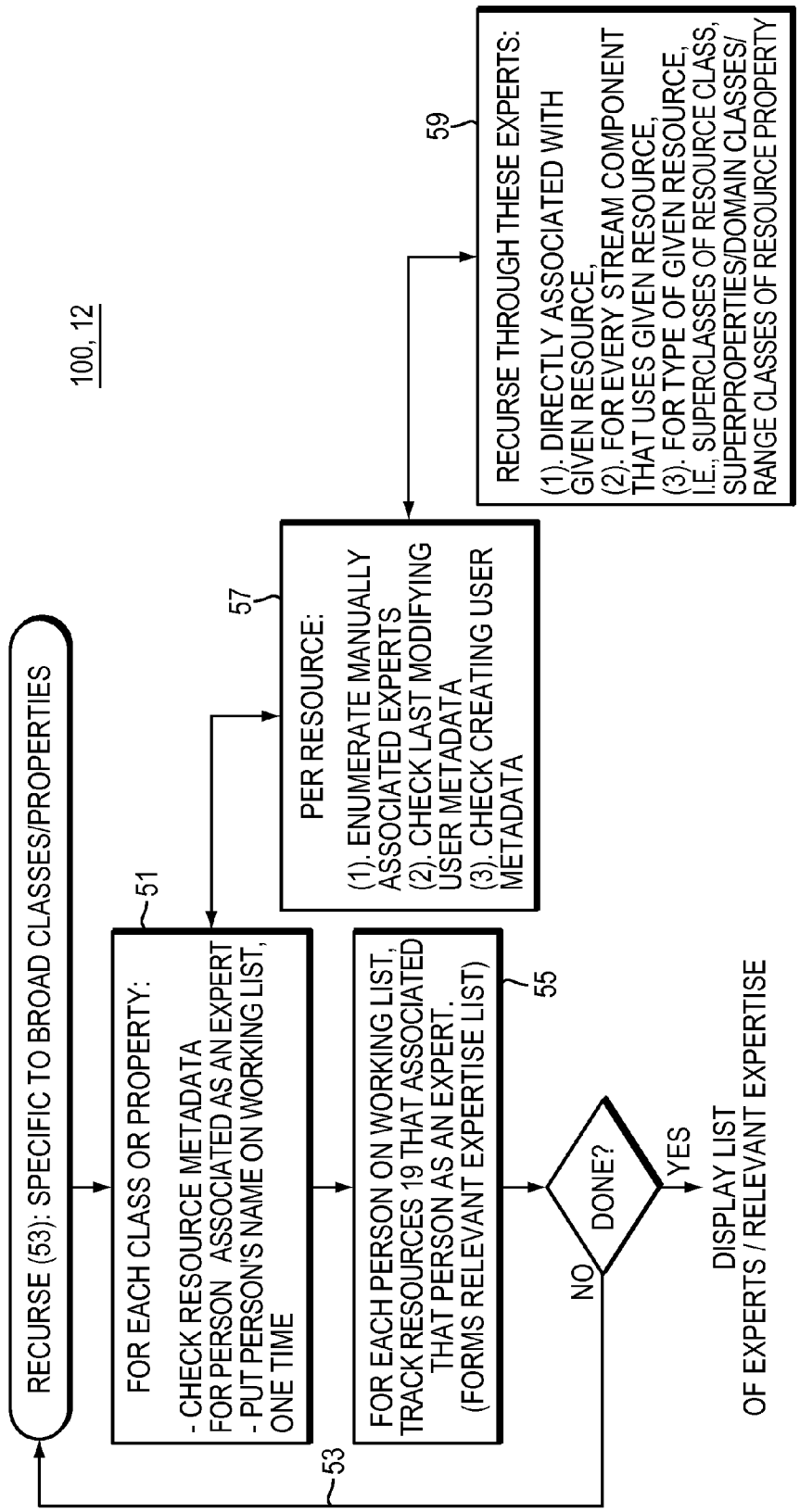
FIG. 8 is a flow diagram of the invention expertise location process or tool.

With reference to FIG. 8, expertise location starts at step 51 with a given class or property, and proceeds in a recursive manner (loop 53). If a limit has been specified, the number of experts is checked after each addition, and the search is aborted once the requested number of experts has been reached.

For each expert located, tool 100/step 55 keeps a list of all the resources 19 that were encountered during the search that had that person associated as an expert. This list of relevant expertise is shown in the user interface (e.g., dialog 41 FIG. 6), to help explain to the analyst why the expert is being recommended. Because a single person may be encountered at several times during the search, tool 100/step 51 only adds the person to the subject list of experts on the first encounter. Subsequent encounters update the list of expertise associated with the user. Any references below to "adding" an expert should be taken to mean "updating 55 the list of expertise if the user is already in the list of experts, or adding 51 the user as an expert if not". In one embodiment, subsequent encounters do not affect the ordering of recommended experts.

Some definitions:

A model "uses" a class if any of the secondary entities in the model have been asserted to be direct members of that class. Restated, models can be "about" entities or can "use" entities. For example, a model "about" John Doe might "use" entities that describe his parents, his employer, or his hometown. For any entity, one can enumerate all of the models "about" it, which one would refer to as "primary" models for that entity (or equivalently, one would say the entity is a primary entity of, or in, the model). One can also enumerate all of the models "using" an entity, which one would refer to as "secondary" models; or equivalently, one would say the entity is a secondary entity in the model.

A model "uses" a property if any of the claims in that model have that property as the predicate.

A PE has zero or more input streams and zero or more output streams. Every input stream is represented by a semantic model, as is every output stream. There is also an overall model for the PE.

A DS has zero input streams and one output stream. The output stream is represented by a semantic model. There is also an overall model for the DS.

A stream component "uses" a class if any of its models (input, output, overall) uses that class. A stream component "uses" a property if any of its models uses that property.

When enumerating the experts directly associated with a resource, tool 100 at step 57 first enumerates any experts that have been manually associated with the resource 19 (such as described above in FIGS. 1-3). Next, tool 100/step 57 checks to see if there is any "last modifying user" metadata associated with the resource 19, and add name of the user to the working list if so. Next tool 100/step 57 checks to see if there is any "creating user" metadata associated with the resource 19, and add name of the user to the working list if so. In one embodiment, tool 100 does not distinguish between manually associated experts and implied experts when constructing the list of experts.

To recursively enumerate the experts associated with a resource 19, tool 100 at step 59 first enumerates any experts that are directly associated with that resource 19. Next, tool 100/step 59 examines every stream component in the system 12 to determine which, if any, use the resource 19. For every stream component that uses the resource 19, tool 100/step 59 adds to the working list the list of experts on that stream component. Finally, tool 100/step 59 examines the type of resource 19 currently being examined and recursively enumerates the experts for that type of resource 19. If the currently examined resource 19 is a class, tool 100/step 59 adds any experts on any of the class' superclasses to the enumeration. If the currently examined resource 19 is a property, tool 100/step 59 adds any experts on any of the property's superproperties to the enumeration, then any experts on any of the property's domain classes, then any experts on any of the property's range classes.

When locating experts, the algorithm/locator tool 100 in one embodiment starts by looking at the most specific classes and properties, gradually expanding the search to more generic concepts and relationships. Loop 53 is illustrative. In other words, searching for experts on the C++ programming language will return those users explicitly associated with C++ before returning those who are specified as experts on programming languages in general.

It should be noted that, conceptually, an "expert" on a class or property need not be an expert on the concept or relationship that is being represented outside the context of the system 12. For example, a programmer who writes a processing element that outputs Person entities may not be a psychologist or anthropologist. But within the context of the system 12, the programmer should be considered an expert on how the Person class is meant to be used, and what the implications are of semantically describing an inquiry or stream component using that class.

After invention tool 100/system 12 displays a list of experts to a requesting analyst, the analyst must still determine which expert (s) to contact and how. By integrating with a directory service like IBM BluePages or other internet-mediated people directory, the analyst can learn more about each recommended expert. In one embodiment, system 12 allows opening the directory web page for any suggested expert. The web browser may be configured to open either inside or outside the CRAFT environment. The directory webpage includes, for example, a wealth of information about the expert, including contact information like phone number, fax number, email address, and physical address, preferred method of contact, a portrait photograph, reporting structure, connections in a social network, reported expertise and skill assessment, and other information collected from external systems such as social bookmarking tools.

The information reported can help the analyst make the final judgment about which expert to contact and how.

Figure 9:
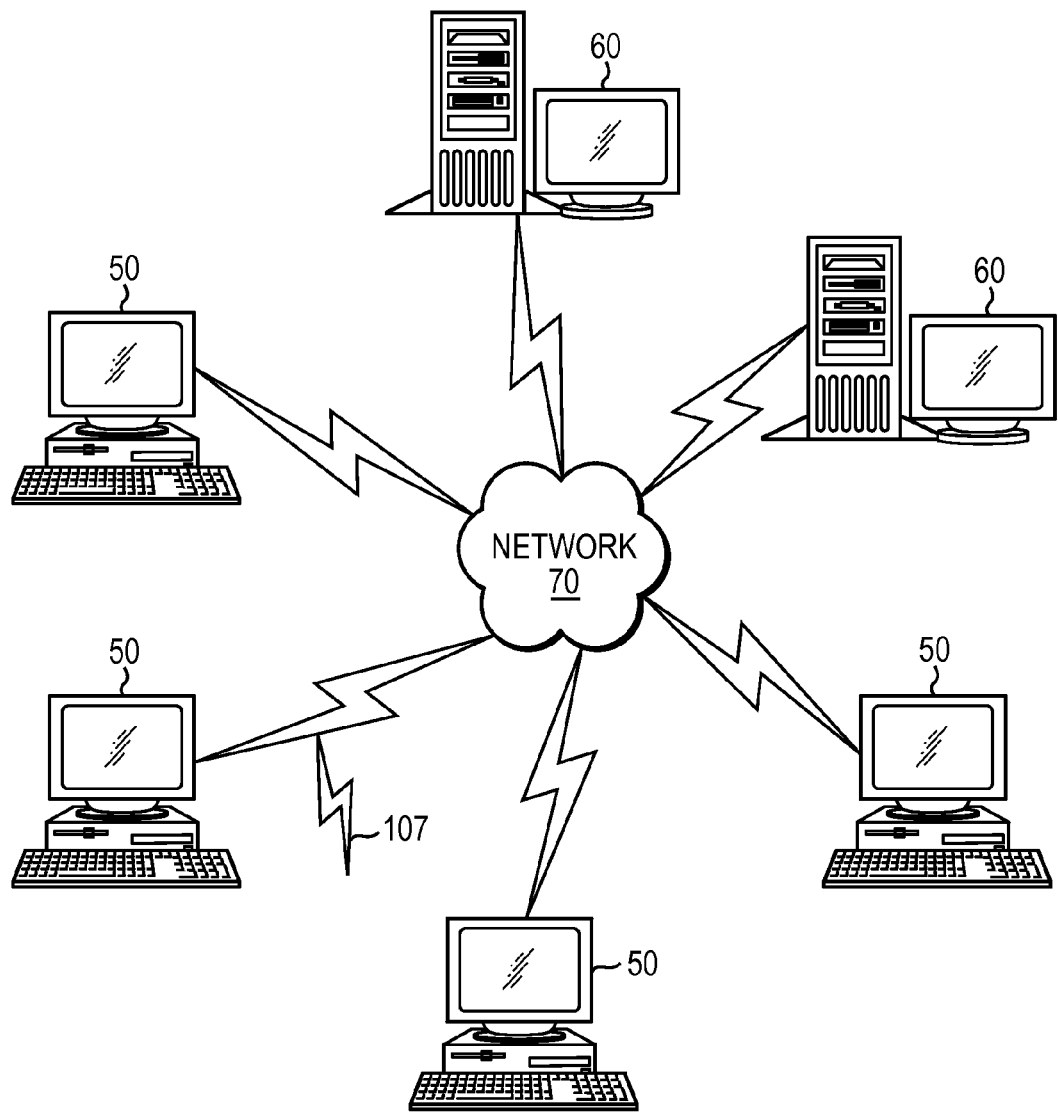
FIG. 9 is a schematic view of a computer network embodying the present invention.

FIG. 9 illustrates a computer network or similar digital processing environment in which the present invention may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 10:
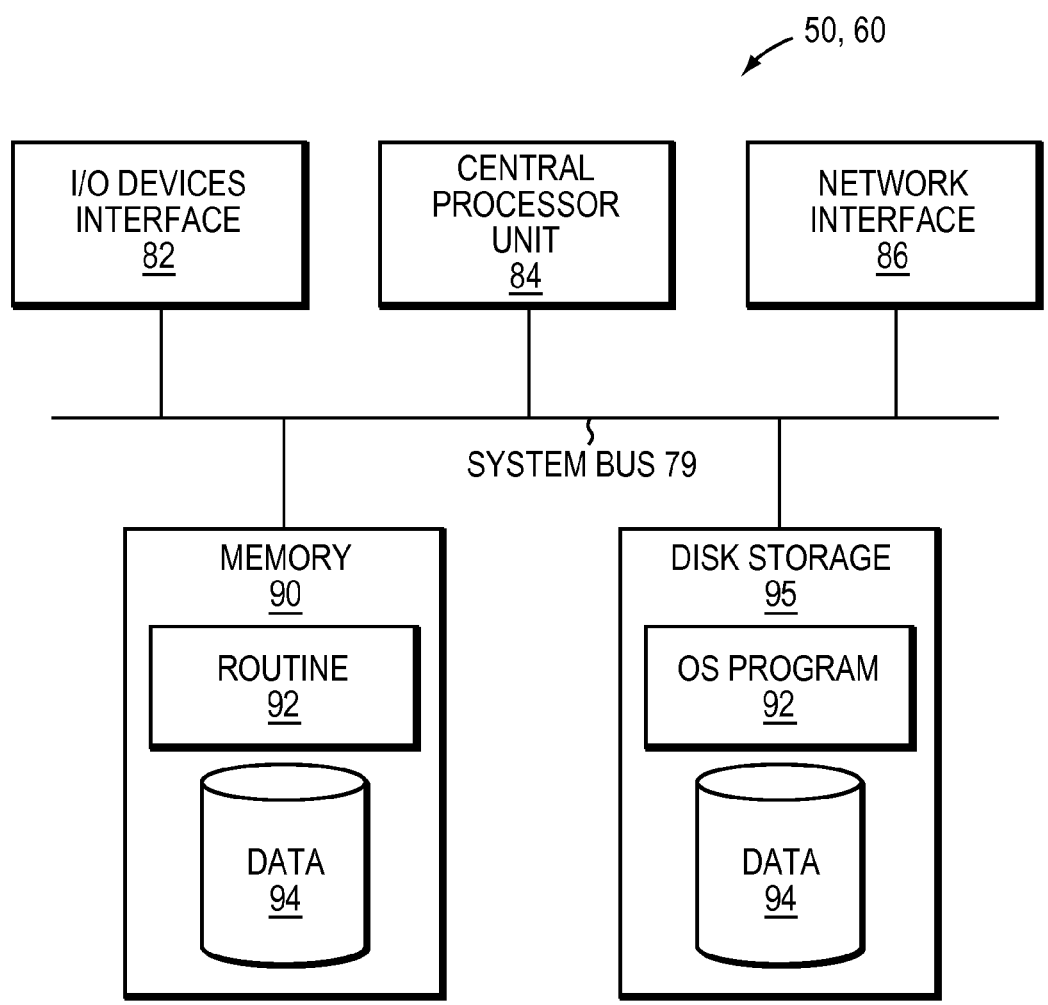
FIG. 10 is a block diagram of a computer node in the network FIG. 9.

FIG. 10 is a diagram of the internal structure of a computer (e.g., client processor/device 50 or server computers 60) in the computer system of FIG. 9. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 9). Memory 90 provides volatile storage for computer software instructions 92 and data 94 used to implement an embodiment of the present invention (e.g., expert locator 100, system 12 and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, the present invention provides an expert locator apparatus, system and/or method that associates individuals with specific objects (e.g., resources) which inherit from classes in a hierarchy, and uses those associations to find experts about a particular subject area. More generally, the present invention provides the ability to search, beginning from a more general superclass, and find experts associated with particular objects inheriting from that superclass. For example, a search for "social media" returns Jane Doe who writes a blog, which is a subclass of the "social media" object. The present invention ontology search also can start from a subclass and move to a superclass. Thus both hierarchical directions of ontology searching are utilized in embodiments of the present invention.

For example, if one is having trouble training a St. Bernard dog, he might first look for an expert on training large dogs, falling back to searching for an expert on training dogs in general, falling back to any animal trainer, etc. This illustrates the invention ontology search starting with a subclass and moving toward a superclass. On the other hand, the invention ontology search can also go from superclass to subclass. For instance, if one asked the system to give all of the animal training experts, the invention system would automatically include any people who had been asserted to be experts in training large dogs, since the ontology would contain the information that dogs are animals and large dogs are one type of dog.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While this invention has been particularly shown and described with references to example embodiments thereof, it will be understood by those skilled in the art that various changes in form and details may be made therein without departing from the scope of the invention encompassed by the appended claims.

For example, the foregoing description is in terms of resources and a semantic stream computing platform. Other contexts are suitable. Accordingly, the present invention provides the ability to search beginning from a more general superclass, and find experts associated with particular objects inheriting from that superclass, as well as searching from a subclass and moving to a superclass.

What is claimed is:

1. A computer implemented method of locating expertise, comprising:
   in a processor:
      associating experts with respective certain objects, each object inheriting from classes in a mutable ontology-based hierarchy, said associating resulting in respective correspondences between experts and the certain objects, wherein the mutable ontology-based hierarchy is extendable on demand such that said associating includes adding objects or classes, on demand, to the ontology-based hierarchy;
      using the correspondences in a computer processor routine executed by the processor and finding a candidate expert about a particular subject area, the candidate expert being in one of the correspondences associating the candidate expert with one of the certain objects, said finding being ontology-based and allowing the certain object associated with the candidate expert to be found from the particular subject area whether the particular subject area is a relatively specific topic or a more general area of expertise than the certain object; and
      displaying as output an indication of the candidate expert.

2. A computer method as claimed in claim 1 wherein the particular subject area is a superclass of a class of the one certain object in the one correspondence of the candidate expert.

3. A computer method as claimed in claim 1 wherein the particular subject area is a subclass of a class of the one certain object in the one correspondence of the candidate expert.

4. A computer method as claimed in claim 1 wherein the certain objects are topics.

5. A computer method as claimed in claim 4 wherein the hierarchy is an ontology of the topics.

6. A computer method as claimed in claim 1 wherein the output further indicates relevancy of the candidate expert.

7. A computer method as claimed in claim 1 wherein the step of finding finds multiple experts per certain object, and
   the step of displaying includes listing the multiple experts.

8. A computer method as claimed in claim 7 wherein the listing is sorted in order of experts who have the most relevant expertise.

9. A computer method as claimed in claim 1 wherein the step of associating allows user interactive corresponding of an expert to a certain object.

10. A computer method as claimed in claim 1 wherein the step of finding recurses from specific to broad classes or properties of the certain objects in the ontology-based hierarchy.

11. Computer apparatus locating expertise, comprising:
    a user interface executable by a computer and enabling users to associate experts with respective certain objects, each object inheriting from classes in a mutable ontology-based hierarchy, the user interface resulting in respective correspondences between experts and the certain objects, wherein the mutable ontology-based hierarchy is extendable on demand such that said associating includes adding objects or classes, on demand, to the ontology-based hierarchy;
    a processor executable ontology-based location tool coupled to utilize the correspondences and to, based on ontology, find a candidate expert about a particular subject area, the candidate expert being in one of the correspondences associating the candidate expert with one of the certain objects as user defined through the user interface, the tool allowing the certain object associated with the candidate expert to be found from the particular subject area whether the particular subject area is a relatively specific topic or a more general area of expertise than the certain object; and an output member displaying an indication of the candidate expert.

12. Computer apparatus as claimed in claim 11 wherein the particular subject area is a superclass of a class of the one certain object in the one correspondence of the candidate expert.

13. Computer apparatus as claimed in claim 11 wherein the particular subject area is a subclass of a class of the one certain object in the one correspondence of the candidate expert.

14. Computer apparatus as claimed in claim 11 wherein the certain objects are topics.

15. Computer apparatus as claimed in claim 14 wherein the hierarchy is an ontology of the topics.

16. Computer apparatus as claimed in claim 11 wherein the output further indicates relevancy of the candidate expert.

17. Computer apparatus as claimed in claim 11 wherein the location tool further finds multiple experts per certain object, and the output member displays a listing of the multiple experts.

18. Computer apparatus as claimed in claim 17 wherein the listing is sorted in order of experts who have the most relevant expertise.

19. Computer apparatus as claimed in claim 11 wherein the location tool finds candidate experts by recursing from specific to broad classes or properties of the certain objects in the ontology-based hierarchy.

20. A Computer program product for locating expertise, the computer program product comprising:

a non-transitory computer readable storage medium having computer readable program code embodied therewith, the computer readable program code comprising:

computer readable program code configured to associate experts with respective certain objects, each object inheriting from classes in a mutable ontology-based hierarchy, said associating resulting in respective correspondences between experts and the certain objects, wherein the mutable ontology-based hierarchy is extendable on demand such that said associating includes adding objects or classes, on demand, to the ontology-based hierarchy;

computer readable program code configured to find, based on the correspondences and based on ontology, a candidate expert about a particular subject area, the candidate expert being in one of the correspondences associating the candidate expert with one of the certain objects, the code configured to allow the certain object associated with the candidate expert to be found from the particular subject area whether the particular subject area is a relatively specific topic or a more general area of expertise than the certain object; and computer readable program code configured to display as output an indication of the candidate expert.

* * * * *